United States Patent
Liao

(10) Patent No.: US 8,015,892 B2
(45) Date of Patent: Sep. 13, 2011

(54) BICYCLE CLUTCH

(76) Inventor: Shueh-Chih Liao, Taichung (TW)

( * ) Notice: Subject to any disclaimer, the term of this patent is extended or adjusted under 35 U.S.C. 154(b) by 464 days.

(21) Appl. No.: 12/330,507

(22) Filed: Dec. 8, 2008

(65) Prior Publication Data

US 2010/0140035 A1    Jun. 10, 2010

(51) Int. Cl.
*F16H 59/00* (2006.01)
(52) U.S. Cl. ...................................... 74/337.5
(58) Field of Classification Search ................. 74/337.5, 74/363, 335
See application file for complete search history.

(56) References Cited

U.S. PATENT DOCUMENTS

| | | | | |
|---|---|---|---|---|
| 707,359 A | * | 8/1902 | Scharbach | 74/347 |
| 714,614 A | * | 11/1902 | Scognamillo et al. | 74/366 |
| 1,059,275 A | * | 4/1913 | Chambers et al. | 74/366 |
| 3,600,964 A | * | 8/1971 | Sarah | 74/339 |
| 3,696,686 A | * | 10/1972 | Steele | 74/337.5 |
| 4,005,611 A | * | 2/1977 | Jeffries | 74/416 |
| 5,251,504 A | * | 10/1993 | Summerville et al. | 74/368 |
| 6,755,431 B2 | * | 6/2004 | Chang | 280/260 |
| 6,786,497 B1 | * | 9/2004 | Olszewski | 280/260 |
| 7,882,758 B2 | * | 2/2011 | Kubo et al. | 74/372 |
| 2005/0028626 A1 | * | 2/2005 | Fleytman | 74/416 |
| 2005/0028627 A1 | * | 2/2005 | Fleytman | 74/416 |

* cited by examiner

*Primary Examiner* — Dirk Wright

(57) ABSTRACT

A bicycle clutch comprises a transmission shaft, at least two gears, at least two slide blocks, at least two clutch blocks, at least two guiding blocks, a switch shaft and a stationary shaft. The gears and the slide blocks are coaxially disposed on the transmission shaft. The sliding blocks, switch shaft and stationary shaft are coaxially assembled. The clutch blocks are disposed on the transmission shaft, the gears and the slide blocks. The guiding blocks are disposed on the switch shaft and the slide blocks. Through angle deflection, the clutch can selectively make one of the gears engage with the driven assembly to change the rotation speed.

5 Claims, 6 Drawing Sheets

BICYCLE CLUTCH

BACKGROUND OF THE INVENTION

1. Field of the Invention

The present invention relates to a bicycle clutch, and more particularly to a clutch which utilizes angle deflection to restrict axial displacement so as to further control the clutch operation.

2. Description of the Prior Art

The use of bicycle has a long history, and people have been putting many efforts on bicycle research and development. For example, U.S. Pat. No. 6,558,288 discloses a drive shaft driven bicycle which comprises a frame on which are disposed a drive shaft, a first abutment member and a second abutment member. The first abutment serves as a power inputting device and the second abutment is for outputting power. However, this type of bicycle has the following disadvantages:

1, the drive shaft cooperating with the first and second abutting members can only input or output power, its rotation speed, however, cannot be adjusted to satisfy user's advanced requirements.

2, the drive shaft is assembled with the first and second abutting members through bevel gears to transmit power, such assembly requires a relatively large installation space.

The present invention has arisen to mitigate and/or obviate the afore-described disadvantages.

SUMMARY OF THE INVENTION

The primary objective of the present invention is to provide a bicycle clutch which can control clutch operation by using axial displacement.

To achieve the above objective, the bicycle clutch in accordance with the present invention comprises a transmission shaft, at least two gears, at least two slide blocks, at least two clutch blocks, at least two guiding blocks, a switch shaft and a stationary shaft. The transmission shaft is defined with at least two restricting holes. The gears are mounted on the transmission shaft. The slide blocks are inserted in the transmission shaft, in an outer surface of each of the slide blocks is defined a first restricting groove and in an inner surface of the respective slide blocks is defined a second restricting groove. The switch shaft is inserted in the slide blocks and has at least two slots, the switch shaft is inserted on a stationary shaft which is defined with at least one restricting slot. The clutch blocks are inserted in the respective restricting holes of the transmission shaft in such a manner that both ends of the respective clutch blocks are rotatably disposed on the respective gears and the first restricting groove of the respective slide blocks, respectively. The guiding blocks are inserted in the respective slots of the switch shaft in such a manner that both ends of the respective guiding blocks are rotatably disposed in the second restricting groove of the respective slide blocks and the restricting slot of the switch shaft, respectively.

With the above arrangements, the present invention can provide the following advantages:

1, the clutch utilizes angle rotation (and axial displacement to control the engagement/disengagement with the transmission assembly, thus easily controlling the rotation change.

2, the clutch is assembled in a coaxial manner, which reduces the installation space.

DETAILED DESCRIPTION OF THE PREFERRED EMBODIMENT

The present invention will be clearer from the following description when viewed together with the accompanying drawings, which show, for purpose of illustrations only, the preferred embodiment in accordance with the present invention.

Referring to FIGS. 1-6, a bicycle clutch 1 in accordance with the present invention (as particularly shown in FIGS. 1 and 2) is mounted onto a bicycle frame C together with a positioning assembly A and a driven assembly B. The positioning assembly A includes a first shell A1 and a second shell A2 which are oppositely assembled together by screws A3 to accommodate the clutch 1 therein. The clutch 1 has one end pivoted to the first shell A1 as a power-input, and the other end inserted in the second shell A2 for positioning purpose. One end of the second shell A2 is defined with an opening for allowing the clutch 1 to extend out to output power. The lateral side of the second shell A2 is provided with a positioning member A21 which is to be assembled to the frame C by screws A3. The driven assembly B includes a driven shaft B1 with one end coaxially assembled with a driven disc B2 through which the driven shaft B 1 is dynamically connected with the clutch 1 extending out of the second shell A2. The axis of the driven assembly B perpendicularly intersects that of the clutch 1.

Figure 1:
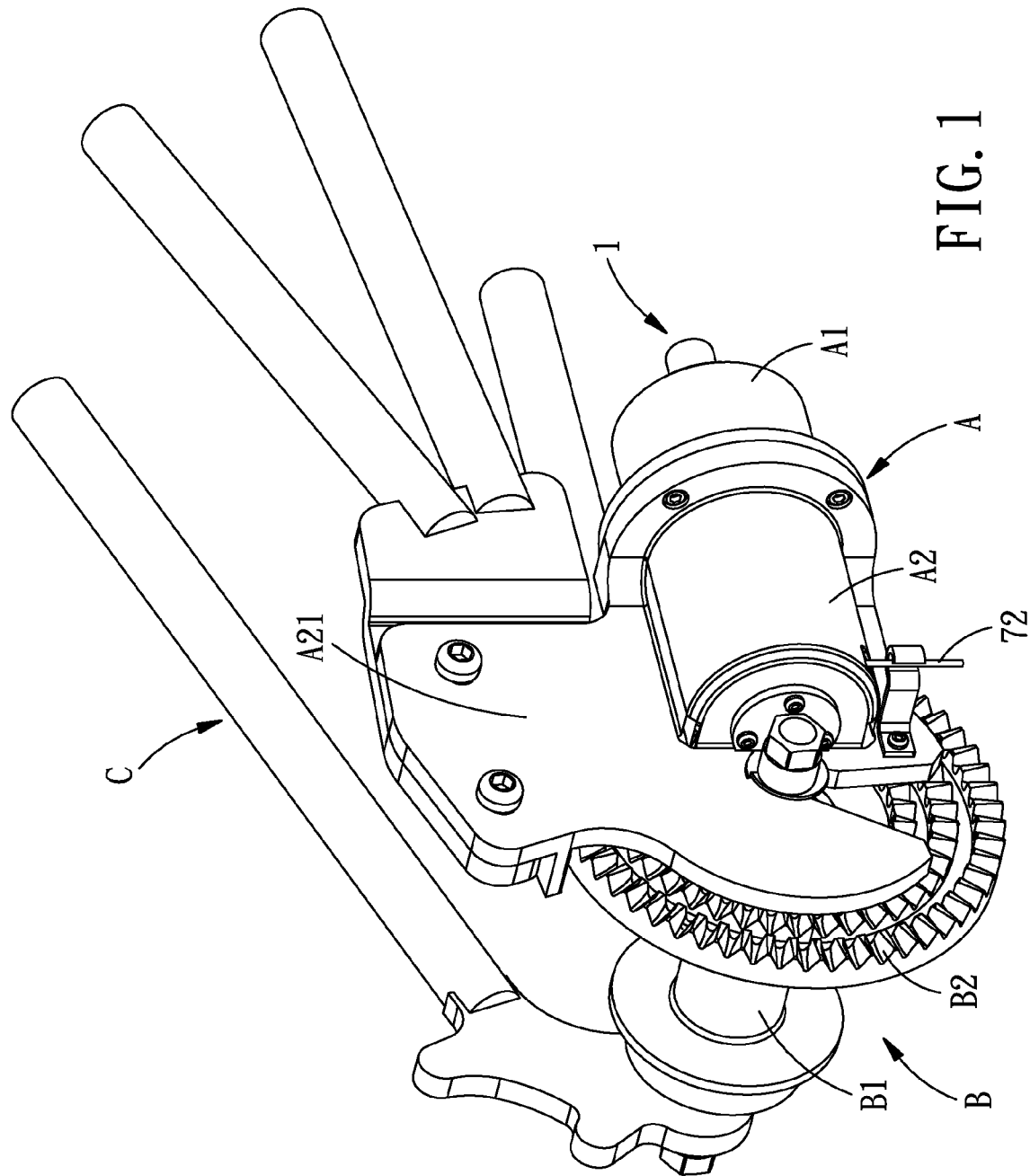
FIG. 1 is a perspective view showing that the clutch of the present invention is mounted onto a bicycle frame together with a positioning assembly and a driven assembly.
Figure 2:
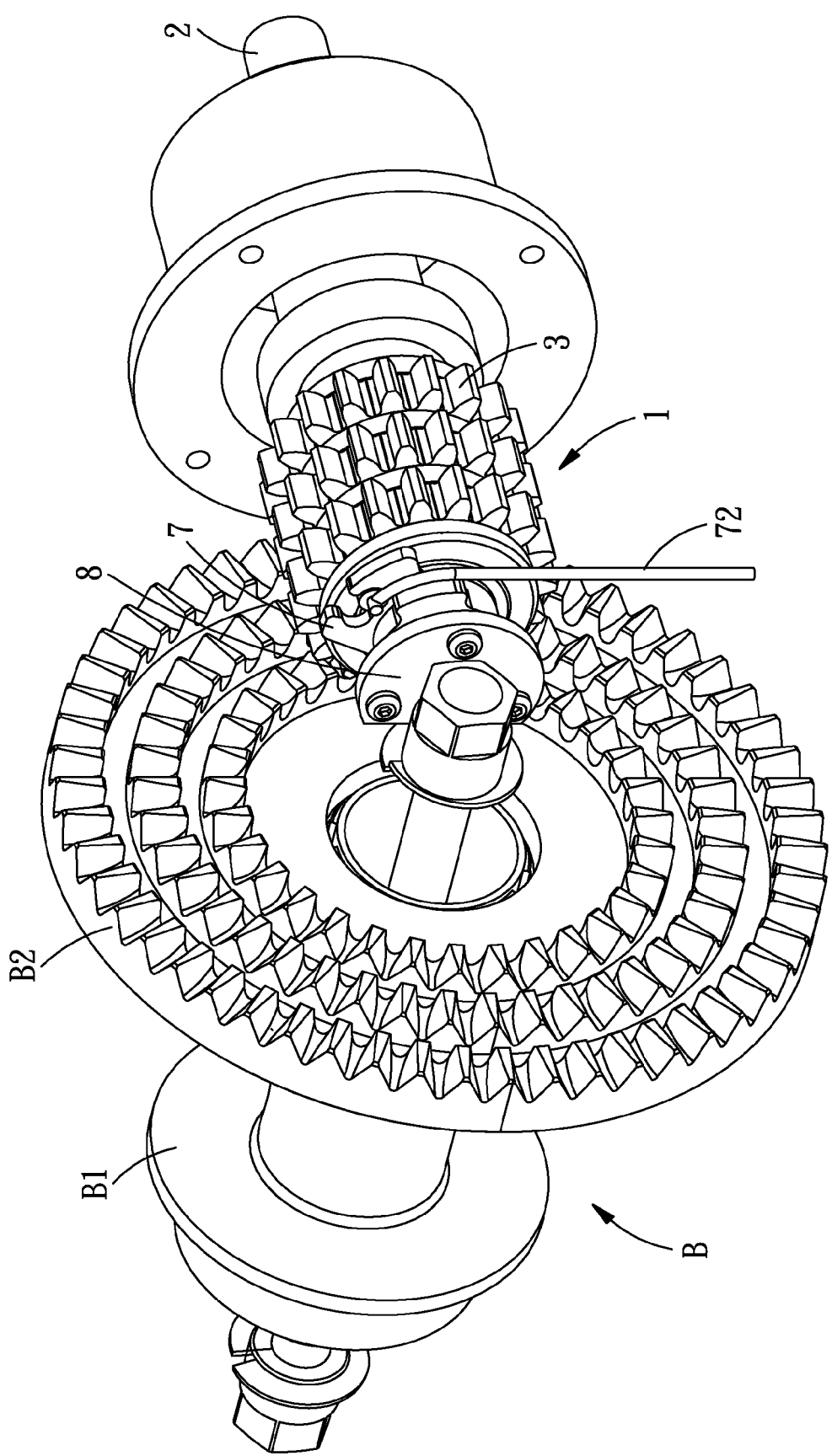
FIG. 2 shows that the clutch of the present invention is equipped with the driven assembly.
Figure 3:
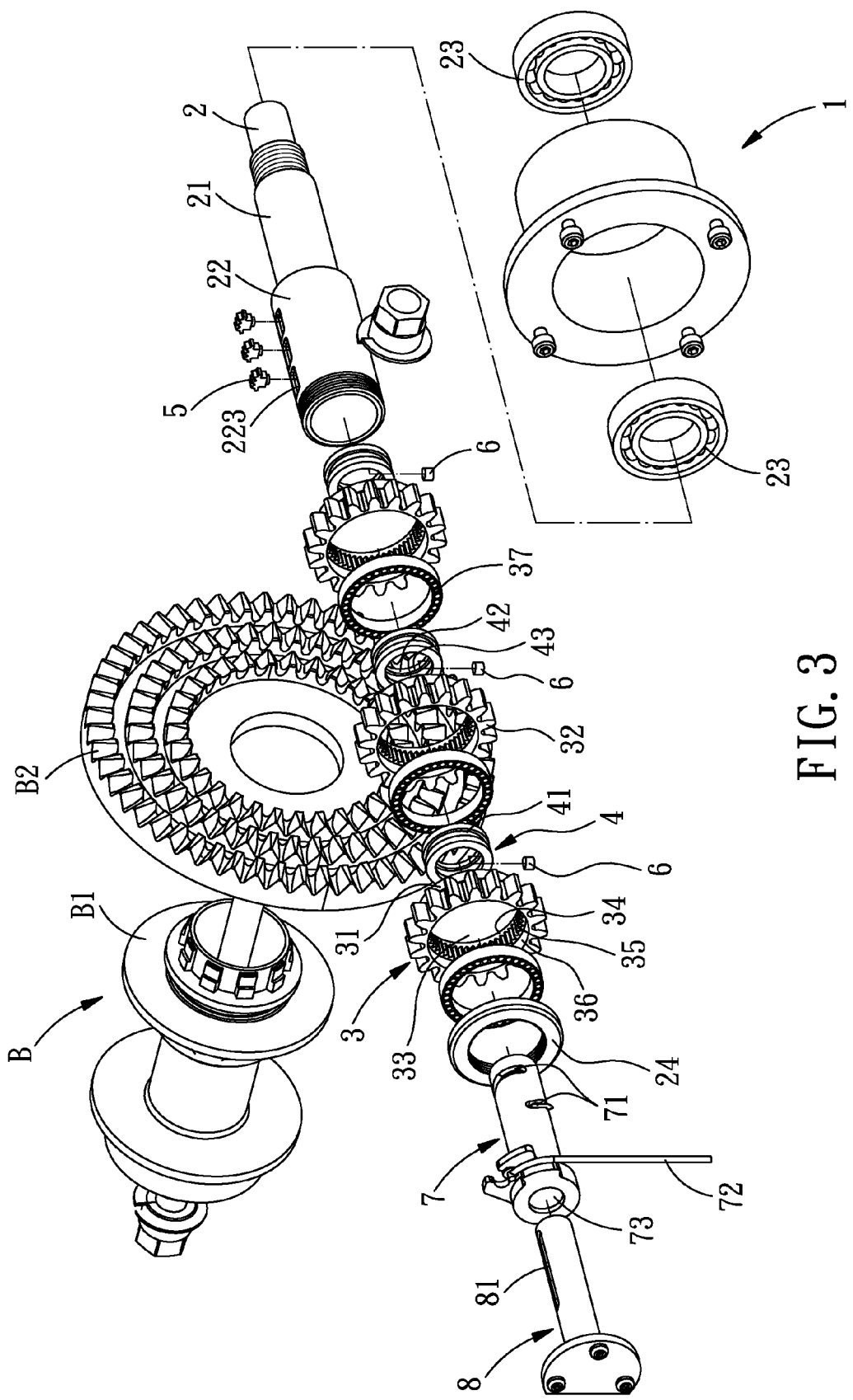
FIG. 3 is an exploded view of the clutch of the present invention and the driven assembly.
Figure 4:
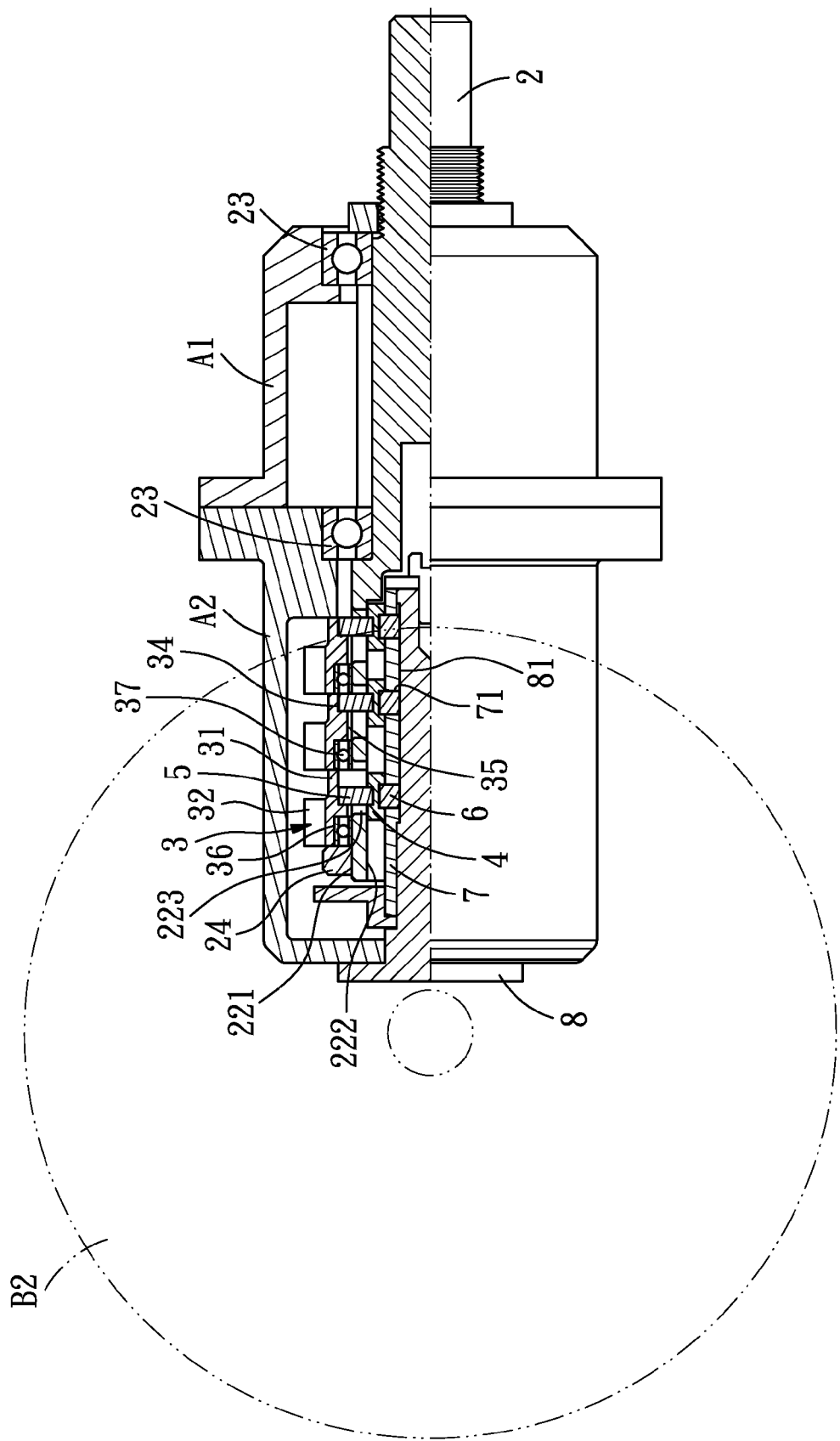
FIG. 4 is a cross sectional view of the clutch in accordance with the present invention.
Figure 5:
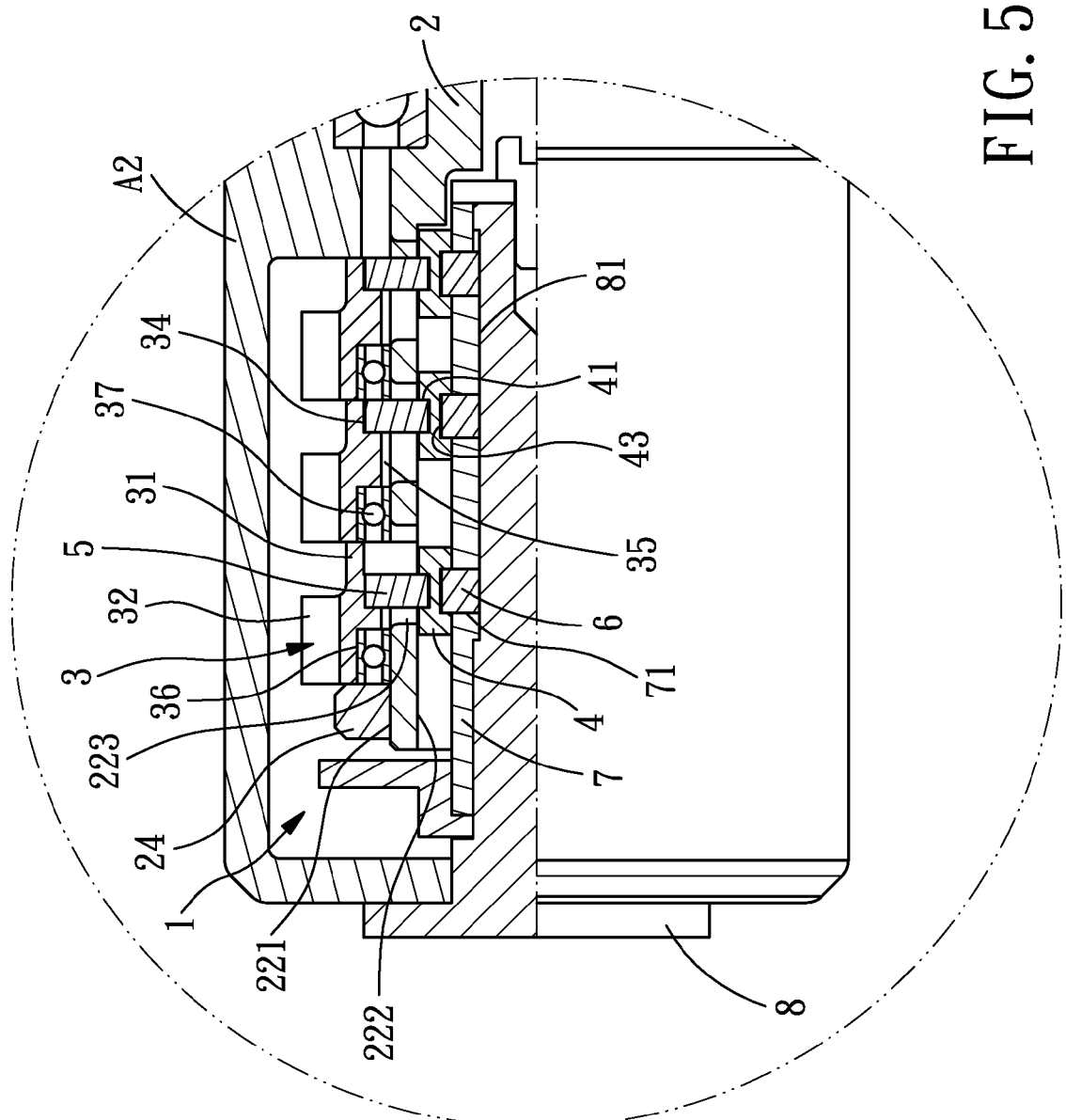
FIG. 5 is a magnified view of a part of FIG. 4.

The clutch 1 (as shown in FIGS. 3-5) includes a transmission shaft 2, at least two gears 3, at least two slide blocks 4, at least two clutch blocks 5, at least two guiding blocks 6, a switch shaft 7 and a stationary shaft 8.

The transmission shaft 2 has a cylindrical shape and includes a driven portion 21, a driving portion 22, a plurality of bearings 23 and a stop ring 24. Both ends of the driven portion 21 of the transmission shaft 2 are pivotally disposed in the first and second shells A, A2, respectively, by the bearings 23. The driving portion 22 is hollow and received in the second shell A2. In the outer surface of the driving portion 22 is annularly formed a first carrying portion 221, and in the inner surface of the driving portion 22 is formed a concave second carrying portion 222 for carrying the slide blocks 4. The driving portion 22 is further defined with at least two spaced-apart restricting holes 223. The stop ring 24 is locked at one end of the driving portion 22 of the transmission shaft 2 to restrict the gears 3 within the first carrying portion 221 of the transmission shaft 2.

The gears 3 each axially include a smooth separating portion 31 and a toothed engaging portion 32. The gears 3 drive the driven shaft B1 to rotate through the engagement of the engaging portion 32 with the driven disc B2 of the driven assembly B. Each of the gears 3 is axially defined with a hole 33 the inner surface of which is axially defined with a smooth idle portion 34, a toothed driving portion 35, and a smooth receiving portion 36 for accommodation of bearing 37 such that the respective gears 3 can be rotatably inserted on the transmission shaft 2 through the bearings 37. Both ends of the gears 3 are restricted in the first carrying portion 221 of the driven portion 22 by the stop rings 24 and the bearings 23.

Each of the slide blocks 4 is provided in its outer surface with an annular first restricting groove 41 for cooperating with the clutch blocks 5 and is axially defined with a hole 42 for insertion of the switch shaft 7. In the inner surface of the each of the slide blocks 4 is further defined an annular second restricting groove 41 for cooperating with the guiding blocks 6.

Each of the clutch blocks 5 has one end cooperating with the idle portion 34 or the driving portion 35 in the hole 33 of the respective gears 3, and the other end slidably inserted in the restricting groove 41 of the respective slide blocks 4 after passing through the restricting holes 223 of the transmission shaft 2.

Each of the guiding block 6 is cylindrical-shaped and has one end slidably disposed in the second restricting groove 43 of the respective slide blocks 4 and cooperates with the switch shaft 7 and the stationary shaft 8 to control the displacement of the slide blocks 4 and the clutch blocks 5.

The switch shaft 7 is cylindrical-shaped and defined with at least two slots 71 for insertion of the guiding blocks 6. The switch shaft 7 is axially defined with a hole 73 for insertion of the stationary shaft 8 and is inserted in the holes 42 of the respective slide blocks 4. One end of the switch shaft 7 is provided with a cable 72 with one end exposed out of the second shell A2. Pulling the cable 72 can make the switch shaft 7 rotate with respect to the slide blocks 4.

The stationary shaft 8 has a cylindrical shape and is formed in its outer surface with a restricting slot 81 for insertion of the guiding blocks 6. The stationary shaft 8 is inserted in the second shell A2 and the hole 73 of the switch shaft 7. The switch shaft 7 rotates to cause angle deflection, making one of the slots 71 of the switch shaft 7 move one of the guiding blocks 6 along the restricting slot 81 of the stationary shaft 8, and the movement of the guiding block 6 will make the clutch blocks 5 selectively engage with the driving portion 35 of the hole 33 of the gears 3 through the slide blocks 4.

The clutch 1 as a whole is such designed that: both ends of the respective guiding blocks 6 are disposed in the second restricting groove 43 of the respective slide blocks 4 and the restricting slot 81 of the stationary shaft 8 to restrict the displacement of the clutch. The respective guiding blocks 6 use the slots 71 of the switch shaft 7 to restrict axial movement and utilize the slide blocks 4 to make the clutch blocks 5 selectively stay in the idle portions 34 of engage with the driving portions 35 of the holes 33 of the gears 3 through the slide blocks 4. When the clutch blocks 5 are located at the idle portion of the gears 3, the gears 3 cannot be rotated by the clutch blocks 5, and when the clutch blocks 5 are engaged with the driving portions 35, the gears 3 will be rotated by the clutch blocks 5.

Figure 6:
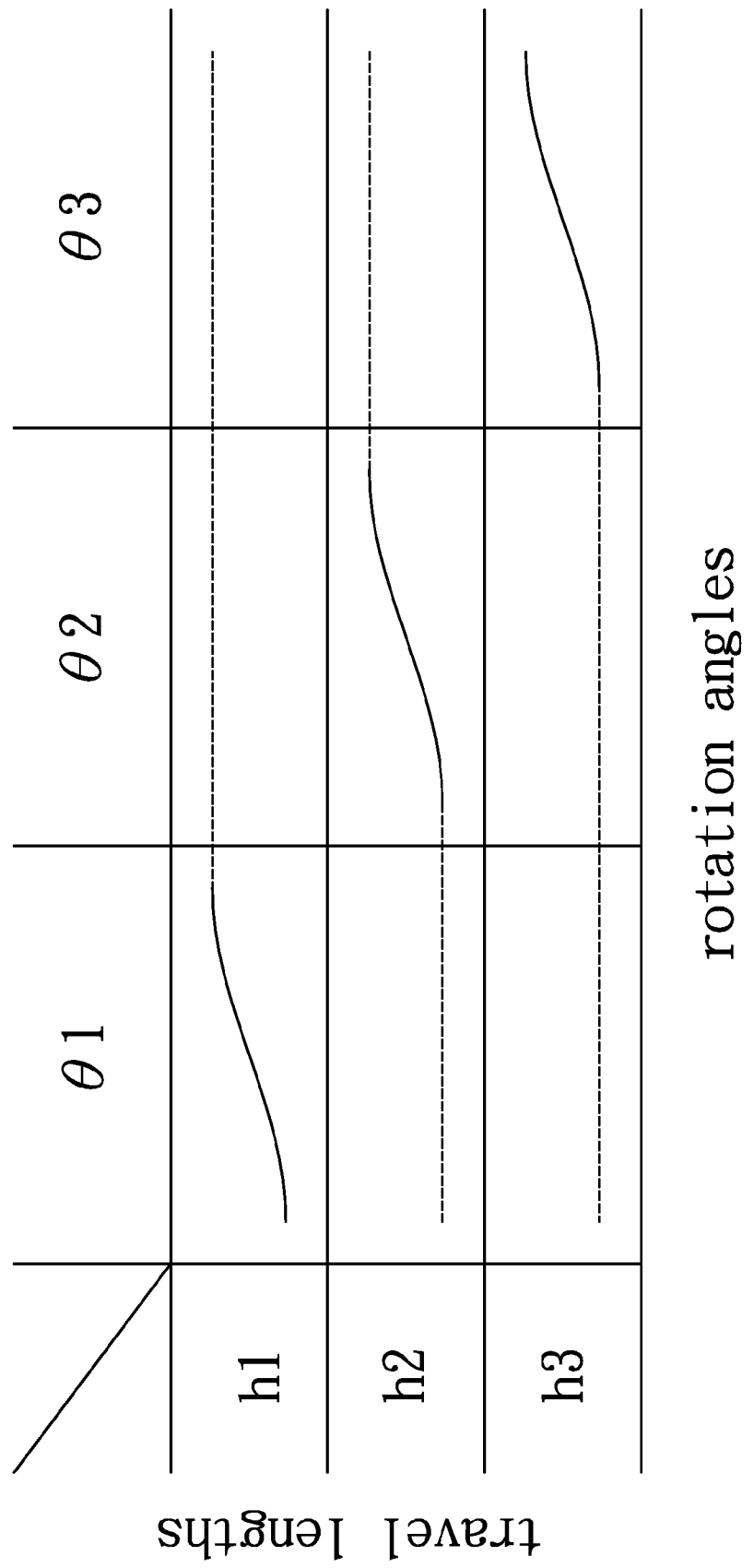
FIG. 6 shows the travel distances and rotation angles in accordance with the present invention.

Referring to FIG. 6, which shows that, under the condition that there are three guiding blocks 6 and three slots 71 in the switch shaft 7, the travel distances of the guiding blocks 6 are a first travel distance h1, a second travel distance h2 and a third travel distance h3, and the rotation angles of the slots 71 are respectively a first rotation angle θ1 corresponding to the first travel distance h1, a second rotation angle θ2 corresponding to the second travel distance h2, and a third rotation angle θ3 corresponding to the third travel distance h3. Hence, every angle deflection of one of the slots 7 that the switch shaft 7 makes will drive one of the guiding blocks 6 to carry out an engaging or disengaging action.

While we have shown and described various embodiments in accordance with the present invention, it is clear to those skilled in the art that further embodiments may be made without departing from the scope of the present invention.

What is claimed is:

1. A bicycle clutch comprising:
   a transmission shaft defined with at least two spaced-apart restricting holes;
   at least two gears rotatably mounted on the transmission shaft;
   at least two slide blocks rotatably inserted in the transmission shaft, in an outer surface of each of the slide blocks being defined a first restricting groove and in an inner surface of the respective slide blocks being defined a second restricting groove;
   a switch shaft rotatably inserted in the slide blocks and having at least two spaced-apart slots, the switch shaft being rotatably inserted on a stationary shaft which is defined with an axial restricting slot;
   at least two clutch blocks being inserted in the respective restricting holes of the transmission shaft in such a manner that both ends of the respective clutch blocks are rotatably disposed on the respective gears and the first restricting groove of the respective slide blocks, respectively; and
   at least two guiding blocks inserted in the respective slots of the switch shaft in such a manner that both ends of the respective guiding blocks are rotatably disposed in the second restricting groove of the respective slide blocks and the restricting slot of the switch shaft, respectively.

2. The bicycle clutch as claimed in claim 1 serving to cooperate with a driven assembly; wherein
   the transmission shaft is hollow, in an outer surface and inner surface of the transmission shaft are formed a first carrying portion and a second carrying portion, respectively;
   the gears each include an engaging portion formed on the outer surface thereof for engaging with the driven assembly, and are axially defined with a hole, in an inner surface of which is defined with a driving portion, the holes of the gears enable the respective gears to be rotatably inserted on the first carrying portion of the transmission shaft;
   each of the slide blocks is axially defined with a hole in an inner surface of which the second restricting groove is formed, and the slide blocks are rotatably inserted in the second carrying portion of the transmission shaft;
   the switch shaft is rotatably inserted in the hole of the respective slide blocks and axially defined with a hole; and
   the switch shaft is rotatably inserted on the stationary shaft through its hole, the switch shaft rotates to cause angle deflection, making one of the slots of the switch shaft move one of the guiding blocks along the restricting slot of the stationary shaft, and the movement of the guiding block makes the clutch blocks selectively engage with the driving portion of the hole of the gears through the slide blocks.

3. The bicycle clutch as claimed in claim 2, wherein the driven assembly includes a driven shaft and a driven disc at one of the driven shaft, and the gears are engaged with the driven disc through the engaging portion.

4. The bicycle clutch as claimed in claim 2 is mounted onto a bicycle frame together with a positioning assembly, the positioning assembly includes a first shell and a second shell which are oppositely assembled together by screws to accommodate the clutch therein, the clutch has one end pivoted to the first shell as a power-input, and the other end of the clutch inserted in the second shell for positioning purpose, one end of the second shell is defined with an opening for allowing the clutch to extend out to output power, the second shell is provided with a positioning member through which the second shell is assembled to the bicycle frame.

5. The bicycle clutch as claimed in claim 2, wherein a bearing is disposed between the hole of the respective gears and the first carrying portion of the transmission shaft.

* * * * *